United States Patent [19]
Bernard et al.

[11] 3,803,381
[45] Apr. 9, 1974

[54] ARC WELDING GUN

[75] Inventors: Arthur A. Bernard, Beecher; Richard A. Bernard, Flossmoor, both of Ill.

[73] Assignee: Dover Corporation, New York, N.Y.

[22] Filed: Dec. 22, 1971

[21] Appl. No.: 210,776

[52] U.S. Cl. .................................. 219/130, 219/74
[51] Int. Cl. ............................................. B23k 9/00
[58] Field of Search ............ 219/130, 139, 144, 74, 219/75, 136; 16/110, 116; 174/46; 339/58

[56] References Cited
UNITED STATES PATENTS

| | | | |
|---|---|---|---|
| 3,689,732 | 9/1972 | Hill | 219/136 |
| 2,547,872 | 4/1951 | Kissick | 219/74 X |
| 2,550,495 | 4/1951 | Pilia | 219/75 |
| 3,469,070 | 9/1964 | Bernard et al. | 219/130 |
| 3,596,049 | 7/1971 | Ogden | 219/136 |
| 3,121,784 | 2/1964 | McGinty et al. | 219/75 |
| 2,294,321 | 8/1942 | Schulfer, Jr. | 219/138 |
| 2,357,457 | 9/1944 | Churchward | 219/138 |
| 3,510,623 | 5/1970 | Woolgast | 214/138 |
| 2,833,913 | 5/1958 | Bernard | 214/130 |

*Primary Examiner*—J. V. Truhe
*Assistant Examiner*—George A. Montanye

[57] ABSTRACT

A liquid cooled arc welding gun for continuous-feed, consumable-electrode, gas-shielded arc welding. The gun enables high-deposition-rate, low-current-density, low pollution MIG welding. The gun includes a gas nozzle having an outer wall and a thin metal inner wall cooperating to form a thin elongate cylindrical chamber within the interior of the gas nozzle for the circulation of liquid coolant. Coolant inlet and outlet ports are provided in the outer wall for connection with a coolant supply hose and a coolant outlet hose, respectively. A baffle is disposed within the cylindrical chamber between the coolant inlet port and the coolant outlet port and arranged to cause liquid coolant entering the coolant inlet port to flow along an annular path through all but a minor portion of the circumference of the cylindrical chamber. The gas nozzle is telescoped over a sleeve of electrical-insulating, heat-conductive material which, in turn, is telescoped over the head member and current contact tip assembly of the arc welding gun to electrically insulate the gas nozzle from the welding current circuit while providing a path for conduction of heat from the current contact tip to the liquid coolant. The arc welding gun is provided with an air-cooled tubular handle, and the liquid coolant supply and outlet hoses freely extend through the tubular handle enabling the gas nozzle to be readily removed for cleaning without disconnecting the coolant hoses.

3 Claims, 8 Drawing Figures

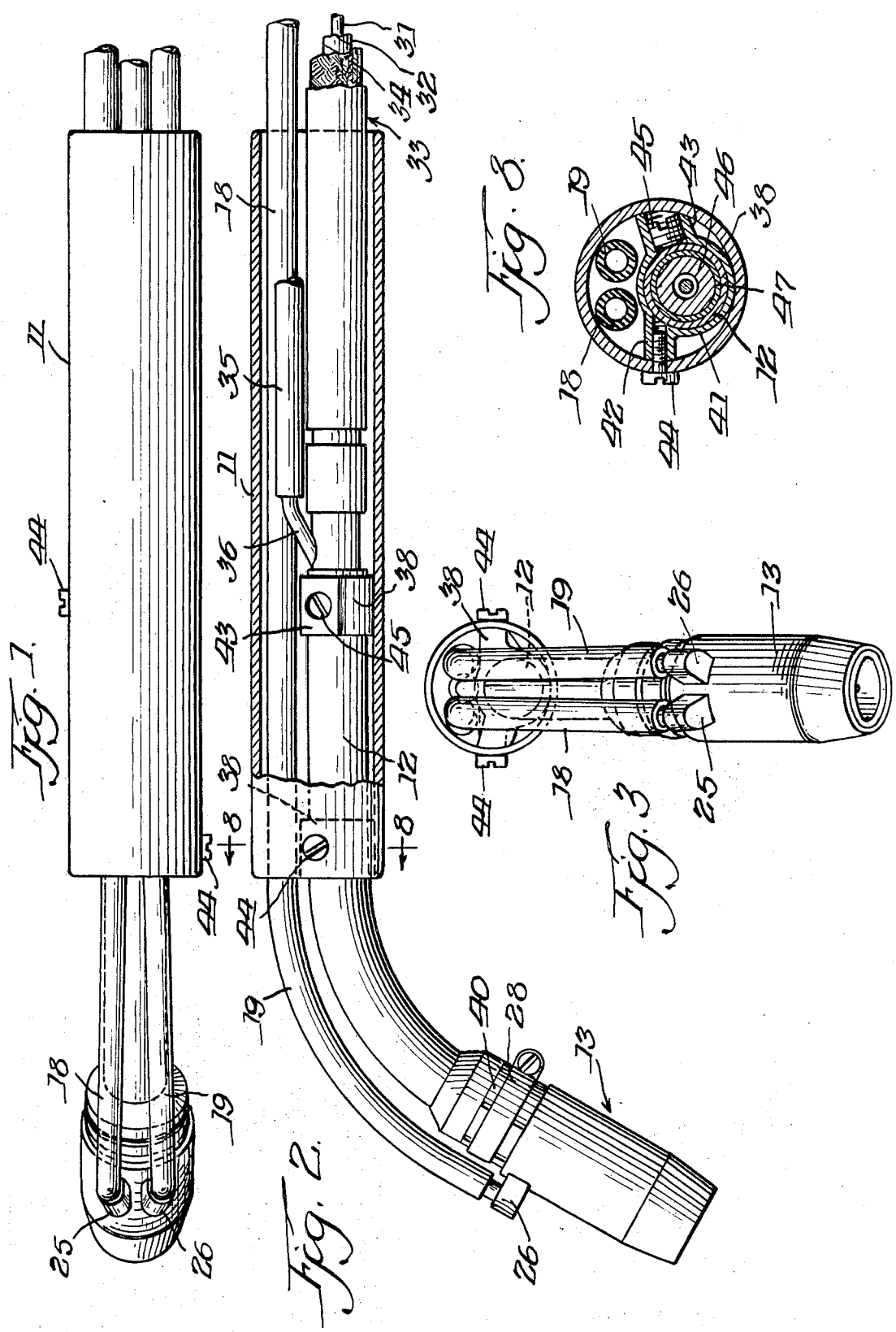

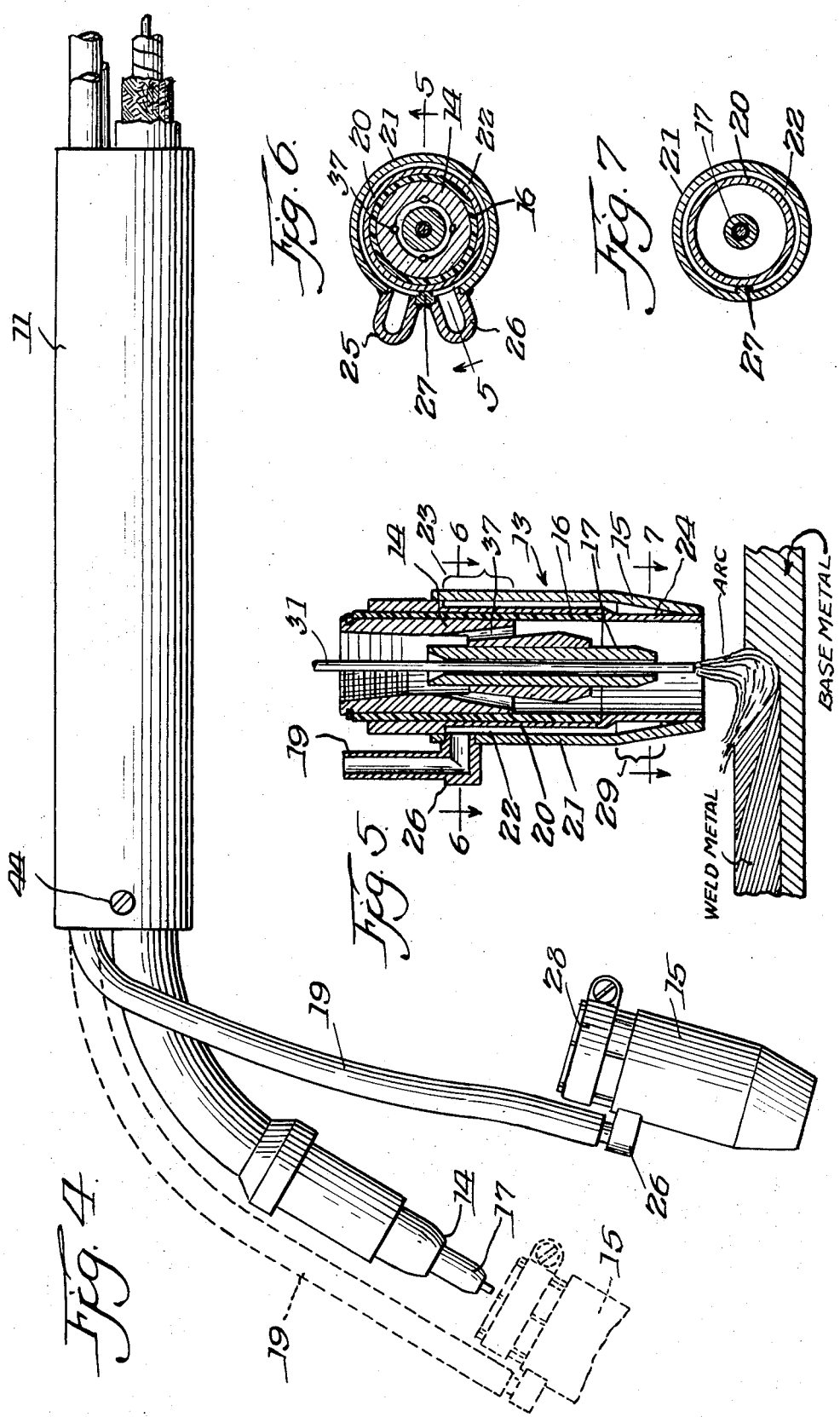

ARC WELDING GUN

This invention relates to an arc welding gun of the type used for applying consumable-electrode, gas-shielded arc welding processes commonly called MIG processes, and more specifically, to a welding gun of the type in which heat absorbed by the gun from the welding operation is drained from the gun by circulating a liquid coolant, such as water, through the gun.

As is well known to those skilled in the art, the efficiency of a MIG welding operation may be measured in terms of the pounds of base metal and electrode metal melted by the arc per unit time. In the endeavor to increase the efficiency of MIG welding, it has become common practice to make use of ultrahigh welding current densities. But this practice increases the level of harmful pollution emitted by the welding operation.

It is important to understand at this juncture that there is a close relationship between the current density used in a MIG welding operation and the harmful pollution produced by the welding operation. As the current density is increased, a greater amount of metal vapor escapes into the ambient air where it is oxidized to become harmful oxide "smoke." This effect can be better understood by considering the case of MIG welding with a solid metal electrode and an inert shield gas such as Argon. If the solid metal electrode and the base metal surfaces are clean in the sense of being relatively free of oxides, grease, oil, and plain shop dirt, the air pollution generated by the welding operation can be traced to vaporized base metal and electrode metal — primarily electrode metal — and the volume of vaporized metal is a function of the welding current density. For example, when the density of the welding current is at a level of 125,000 amperes per square inch area of electrode and above, practically all of the metal melted at the tip of the electrode is converted directly into atomized metal vapor which leaves the tip of the electrode at what may be referred to as a very high velocity — the electrode metal vapor is literally jetted through the welding arc into the crater formed by the arc in the base metal. At such ultra-high current densities as much as 5 percent of the vaporized electrode metal jetted into the parabolic base metal crater is blown back out of the crater to pass through the blanket of shielding gas to form polluting oxide smoke. By contrast, at a lower current density of about 100,000 amperes per square inch, about 75 per cent of the electrode metal is transferred through the arc in minute size liquid droplet form. Only 25 per cent of the electrode metal is transferred in the form of atomized metal vapor, and the jet force of the arc is reduced. Hence, at this current density level only a moderate volume of air pollution is produced. If the current density is reduced still further, to about 60,000 amperes per square inch, practically all of the electrode metal is transferred in the form of a stream of liquid drops. In this instance, the volume of metal vapor formed and the jet force of the arc are reduced to low levels with the result that the volume of air pollution produced is low enough to be quite harmless.

In addition to the air pollution inhaled by the workman, there is a second form of harmful pollution associated with ultra-high current density arc welding, namely, the emission of intense and penetrating radiation by welding arcs operating at current densities greater than 100,000 amperes per square inch.

The pollution associated with ultra-high density MIG welding operations can be reduced by reducing the welding current level. But reduction of the welding current level results in undesirable lower deposition rate efficiency. The current density can also be reduced by increasing the size of the electrode. But increasing the size of the electrode results in a reduction in the resistance heating of the electrode in the region between the point of current contact by the electrode with the current contact member of the welding gun and the tip of the electrode and, hence, requires a compensating increase in the level of welding current used. What is required then is an increase in the size of the electrode used and an increase of lesser percentage in the welding current magnitude. Yet conventional arc welding guns cannot handle the higher welding current level necessary to significantly reduce the pollution associated with ultra-high density welding arcs while maintaining the maximum level of deposition rate efficiency. Conventional MIG arc welding gun cooling systems do not conduct sufficient heat from the arc welding gun to permit operation of the gun at the high welding current levels necessary.

Accordingly, it is a principal object of the present invention to provide an arc welding gun having an improved cooling system which permits the use of sufficiently high welding currents making practical the use of larger size solid metal electrodes to achieve significant reduction of pollution attributable to ultra-high density welding arcs without reduction of deposition rate efficiency. Indeed, it is a further principal object of the present invention to provide an arc welding gun having a cooling system which permits the use of welding current levels sufficient to achieve both significant reduction in pollution attributable to high current density welding arcs and significant increase in deposition rate efficiency.

The maximum welding current which can be efficiently handled by air cooled or water cooled conventional welding guns is about 600 amperes. The capacity of the welding gun of this invention is about 800 amperes when Argon gas is used for the shielding medium, and about 1,000 amperes when $CO_2$ is the shielding medium. At the Argon gas rating of 800 amperes with the arc operating at 35 volts, the arc energy is about 28,000 watts which in terms of BTUs amounts to about 95,500 BTUs per hour — sufficient to comfortably heat a five room home.

It is important to understand that in MIG welding with welding guns, the arc end of the shielding gas nozzle extends about one-fourth inch beyond the arc end of the welding current contact tip, and depending on the type and the size of the electrode, the tip of the electrode extends from about three-sixteenths inch to three-fourths inch beyond the end of the contact tip. The upper portion of the welding arc can therefore be located inside the bore of the gas nozzle and with an average electrode extension of about seven-sixteenths inch, which is only three-sixteenths inch beyond the end of the gas nozzle, the rim of the gas nozzle is only about five-sixteenths inch or three-eighths inch away from the top portion of the arc when the bore of the gas nozzle is five-eighths inch. Yet, although the gas nozzle is within three-eighths inch distance from a heat source capable of melting upward to 30 pounds of weld metal per hour, the nozzle must not only be kept below its melting point but the surface of the nozzle must be prevented from becoming "wet" by the heat, otherwise the metal vapor and weld metal spatter from the weld bead crater will become fused to the gas nozzle. The efficiency of the cooling system of this invention also prevents the contact tip from melting and prevents its surface becoming wet from heat when operating at the welding current levels mentioned above.

It is important to understand that although heat must be efficiently drained from the welding current contact tip to prevent serious overheating which shortens tip life, it is necessary to maximize the heat drainage from the gas nozzle because the total lower rim of the gas nozzle and the inner surface of the gas nozzle as far back as 1 inch from the rim of the gas nozzle (a surface area of about 3 square inches) is exposed to the direct heat of the welding arc, whereas it is only the arc end of the welding current contact tip which is exposed to the direct heat of the arc.

When MIG solid wire electrode welding is used for welding one-fourth inch and heavier thicknesses of common steel, the efficiency of the cooling system embodied in this invention permits the following exemplary welding procedures to be used with a significant reduction of pollution and a significant increase in welding deposition rate efficiency when compared with conventional ultra-high current density MIG welding procedures:

1. five sixty-fourths inch solid wire electrode, 400 ampere welding current, 30 volt arc, 30 cubic feet per minute shielding gas flow, and 83,600 amperes per square inch current density;
2. three thirty-seconds inch solid wire electrode, 550 ampere welding current, 32 volt arc, 35 cubic feet per minute shielding gas flow, and 80,850 amperes per square inch current density;
3. seven sixty-fourths inch solid wire electrode, 675 ampere welding current, 35 volt arc, 40 cubic feet per minute shielding gas flow, and 71,550 amperes per square inch current density;
4. one-eighth inch solid wire electrode, 800 ampere welding current, 37 volt arc, 50 cubic feet per minute shielding gas flow, and 81,000 amperes per square inch density.

The shielding gas is preferably an inert gas such as Argon (slightly oxygen enriched for better arc conditions) in order to minimize harmful pollution attributable to the shielding gas. In this connection, it should be noted that the use of carbon dixode shielding gas tends to result in carbon monoxide pollution. It should also be noted that although the preceding discussion has been based on the reduction of pollution from solid metal electrode welding, the welding gun of this invention is also useful in reducing pollution contributed by MIG cored wire electrode welding operations as well as increasing the deposition rate efficiency. Although the raw earth materials contained in the core of a cored wire electrode contribute an additional pollution source which is not a function of welding current density, the reduction of escaping electrode and base metal vapor by current density reduction obtainable with the present arc welding gun does result in a significant reduction in the volume of pollution produced per pound of weld metal. A nine sixty-fourths inch cored wire electrode can be deposited by a 1,000 ampere welding arc with a low current density of 64,000 amperes per square inch.

To better understand the improved liquid cooling system embodied in the arc welding gun of the present invention, it should first be noted that conventional liquid cooled MIG arc welding guns are of four basic types which can be briefly described as follows:

1. The type in which the coolant is circulated through the electrically-live head portion of the gun to which the gas nozzle and the welding current contact tip are connected. With this system, heat is drained from the contact tip quite efficiently but, because the gas nozzle must be electrically insulated from the head portion to prevent shorting to the base metal should the gas nozzle accidentally come into contact with the base metal, very little heat is drained from the gas nozzle where heat drainage is needed most.
2. The type in which the coolant is circulated through a circular duct formed by O-rings composed of electric insulating material and disposed between the outer surface of the head portion and the inner surface of the gas nozzle telescoped over the head portion. This system provides excellent cooling for both the contact tip and the gas nozzle, but is not practical because an electrolytic phenomenon develops in the coolant between the head portion which is electrically-live with welding current and the gas nozzle which is highly charged with ions radiated to the gas nozzle from the welding arc during the welding operation.
3. The type in which in order to prevent the electrolytic action referred to above, the coolant is circulated through a portion of the welding gun which is not a part of the welding current circuit and to which the gas nozzle is mechanically connected by a threaded connection. With this method very little heat is drained from the contact tip to the coolant because of the lack of an adequate heat conducting path from the contact tip to the portion through which the coolant is circulated, and any heat drained from the gas nozzle must pass through the mechanically threaded connection which is difficult to maintain tight because repeatedly the nozzle is expanded when heated during welding and contracted when cooling down when welding stops — and most welding is an intermittent operation.
4. The type in which the coolant is circulated through a metallic tube coiled around the outside surface of the gas nozzle and fused thereto by brazing to become an integral portion of the gas nozzle. This system drains heat from the gas nozzle but is unsatisfactory and is not acceptable as a solution to the heat problem for several reasons, the two most important reasons being that the coiled metallic tubing produces an overall nozzle size which obstructs the welding operator's view of the welding arc, and when the brazed on coiled tube is located at the gun end of the gas nozzle to provide improved visibility beyond the arc end of the nozzle, heat is not conducted through the wall of the nozzle from the arc exposed end to the opposite cooled end at a fast enough rate to prevent melting when the nozzle is subjected to heat produced by welding current beyond conventionally used magnitudes.

Therefore, it is an important object of the present invention to overcome the deficiencies of conventional liquid cooling systems for arc welding guns and to provide a liquid cooled arc welding gun which will handle an 800 ampere welding arc without the contact tip or the gas nozzle melting or rapidly eroding away by evaporation. Actually, liquid cooled guns embodying this invention can operate in the field at 1,000 amperes.

Another important object of this invention is to reduce the cost of gas nozzles by providing a nozzle which outlasts conventional nozzles, yet, due to simplicity of design, costs the user only about twice the cost of conventional nozzles. The extended life of the nozzle is due to the cool temperature at which it operates. The nozzle cannot melt, and it evaporates at a very, very slow rate.

Another very important object of this invention is to provide means for cooling the contact tip and, more importantly, the gas nozzle of the gun so effectively that weld metal spatter and metal vapor ejected out of the parabolic shaped crater of the weld during welding will not fuse to the gas nozzle or the contact tip and will not even tightly adhere to these two parts.

Another important object of this invention is to provide a welding gun in which the gas nozzle can be removed from the gun and put back onto the gun in a quick and simple manner. Periodic removal of the gas nozzle in any gun used for gas shielded arc welding is necessary to permit the removal of weld metal spatter and condensed metal vapor which collects within the chamber of the gas nozzle. With this invention the gas nozzle is simply and easily pulled off and then pushed back onto the welding gun.

Still another important object is to provide a liquid cooled arc welding gun in which the cooling system is so simple in design that the gun is no larger and weighs no more than an ordinary air cooled gun which has not more than half the current handling capacity as compared with the gun of this invention. This gun, therefore, is no more fatiguing to use than an ordinary air cooled gun. The simplicity of design, moreover, avoids the O-ring seals and cumbersome expensive fittings found in conventional liquid cooled guns. The present invention makes it possible to provide industry with a liquid cooled gun that costs no more than a conventional air cooled gun which deposits only half the weld metal in pounds per unit time.

In accordance with the present invention, a gas nozzle is provided having an outer wall and a thin metal inner wall cooperating to form a thin elongate cylindrical chamber within the interior of the gas nozzle for the circulation of liquid coolant. Coolant inlet and outlet ports are provided in the outer wall for connection with a coolant supply hose and a coolant outlet hose, respectively. A baffle is disposed within the cylindrical chamber between the coolant inlet port and the coolant outlet port and arranged to cause liquid coolant entering the coolant inlet port to flow along an annular path through all but a minor portion of the circumference of the cylindrical chamber. The gas nozzle is telescoped over a sleeve of electrical-insulating, heat-conductive material which, in turn, is telescoped over the head member and current contact tip assembly of the arc welding gun to electrically insulate the gas nozzle from the welding current circuit while providing a path for conduction of heat from the current contact tip to the liquid coolant. The arc welding gun is provided with an air-cooled tubular handle, and the liquid coolant supply and outlet hoses freely extend through the tubular handle enabling the gas nozzle to be readily removed for cleaning without disconnecting the coolant hoses.

FIG. 1 is a top view in elevation of a preferred embodiment of an arc welding gun in accordance with the present invention.

FIG. 2 is a side view of the arc welding gun of FIG. 1 depicted partly in elevation and partly in cross section.

FIG. 3 is a front view in elevation of the arc welding gun of FIG. 1.

FIG. 4 is another side view of the arc welding gun of FIG. 1 but depicted partly in elevation and partly in phantom view to illustrate the manner in which the gas nozzle may be removed for cleaning.

FIG. 5 is a cross-sectional view of the head assembly of the arc welding gun of FIG. 1.

FIG. 6 is a cross-sectional view taken along lines 6—6 of FIG. 5.

FIG. 7 is a cross-sectional view taken along lines 7—7 of FIG. 5.

FIG. 8 is a cross-sectional view taken along lines 8—8 of FIG. 2.

Referring now to FIGS. 1 through 3, the arc welding gun of this invention consists of a tubular handle 11, a head assembly 13, and a main trunk or body portion 12 which extends from within the handle 11 in a gooseneck curved formation to the head assembly 13.

The head assembly 13 is shown in cross section in FIG. 5 and consists of a head member 14 which is threaded for attachment to the arc end of the main trunk 12, an insulating bushing or sleeve 16 which is telescoped over the head member 14, a liquid cooled gas nozzle 15 which, in turn, is telescoped over a bushing 16, and a current contact tip 17 which is secured within a central bore of the head member 14.

The consumable electrode 31 is fed to the arc welding gun through a flexible conduit 32 of the welding cable 33 illustrated in FIG. 2 and through the main trunk 12 and the head assembly 13 to the welding arc.

Welding current is conducted to the gun by the conductors 34 of the welding cable 33 and through the electrically-conductive main trunk 12 to the head member and current contact tip sub-assembly of the head assembly 13. More specifically, the welding current is conducted from the main trunk 12 through the head member 14 to the current contact tip 17. The electrode 31 is energized with the welding current through sliding electrical contact with the contact tip 17 as the electrode passes through the central bore of the contact tip 17.

Shielding gas such as Argon or $CO_2$ is conducted to the welding gun by a gas hose 35 which is connected to the main trunk 12 by a suitable fitting 36. The shielding gas flows through the main trunk to the head member 14 of the head assembly and out through the arrangement of ports 37 in the head member. The gas nozzle directs the shielding gas to blanket the welding arc with a continuous flow of shielding gas.

Connected to the liquid cooled gas nozzle 15 are two hoses 18 and 19 as best illustrated in FIGS. 1 and 3. Through hose 18 a coolant is circulated to the gas nozzle 15 from a remotely located coolant source (not shown) to drain heat from the gas nozzle. The coolant is circulated back through the hose 19 to the coolant source or to a drain if the cooling system of the gun is merely connected to a general utility water main.

The coolant used can be plain water, or water which contains chemical additives to increase wetness, or a light mineral oil, or a gas such as compressed air, or compressed air which is saturated with water or oil, or some other suitable chemical in liquid form which improves the heat absorbing efficiency of compressed air.

Referring now in particular to FIGS. 5, 6 and 7, the liquid cooled gas nozzle 15 has a cylindrical metal outer wall 21 and a thin cylindrical metal inner wall 20 which cooperate to form a cylindrical chamber 22 therebetween for the circulation of the coolant. It is important to note that the cylindrical heat exchange chamber 22 extends in length over the major portion of the length of the gas nozzle 15. More specifically, the coolant chamber 22 extends from an upper (or rearward) portion 23 of the nozzle 15 to forward terminus 24 located forwardly beyond the end of the current contact tip 17.

The coolant hoses 18 and 19 are connected, respectively, to hose fittings 25 and 26 which, as shown in FIG. 6, communicate directly with the cylindrical heat transfer chamber 22. Referring to FIGS. 6 and 7, it is important to note that an elongate baffle member 27 is located between the fittings 25 and 26 and preferably extends the entire length of the chamber 22 so that coolant entering the chamber 22 via fitting 25 is forced to flow annularly around the chamber 22 to exit via fitting 26.

A significant feature of the cylindrical heat-exchange chamber 22 is its thin configuration as best depicted in FIGS. 5, 6, and 7. The spacing between the outer wall 21 and the inner wall 20 for the major portion of the length of the chamber is only 0.3125 inch. This thin configuration of the chamber 22 results in an extra large surface area for heat transfer interaction between the coolant circulating through the chamber 22 and the walls defining the chamber 22. To insure a sufficiency of liquid coolant circulating through the highly heated forward end region of the gas nozzle 15, a forward end portion 29 (FIG. 5) of the chamber 22 located forwardly of the sleeve 16 and in close proximity to the welding arc is of triangular cross-sectional configuration, tapering forwardly from a maximum chamber thickness dimension of 0.084 inch.

To provide efficient cooling for a welding gun rated for 800 amperes operating at a 100 per cent duty cycle, the inner diameter of the cylindrical chamber 22 through the major portion of its length is about one inch (providing a circumference of 3.1416 inches), the diameter of the chamber 22 at the forward end portion 29 is about seven-eighths inch (providing a circumference of 2.74 inches), and the total length of the cylindrical chamber 22 is about 1⅝ inches. The coolant is thus forced over approximately 11 square inches of nozzle surface area, and the thickness of the duct, as noted, is made purposely thin to move the coolant over the 11 square inches of surface area at a high velocity to take advantage of the highly effective "wiping" heat-exchange effect while minimizing the fatigue-inducing weight of coolant occupying the chamber 22 at any instant during operation.

It is important to note that heat is drained out of the contact tip 17 into the head member 14 and from the head member 14 through the electrical insulating bushing 16 into the gas nozzle 15. To insure conduction of heat through the electrical insulating bushing 16 from the head member 14 to the gas nozzle 15, the bushing 16 is made of a glass composition which for electrical insulating materials has a high thermal conductivity. More specifically, the bushing 16 is made of laminated woven glass filaments bonded together by a resin made of silica glass sand. Further, to insure conduction of heat from the outer surface of bushing 16 to the inner surface of the gas nozzle 15, the nozzle rearward end portion 40 (comprising over two square inches of the inner wall of the nozzle) is longitudinally slotted to be radially-contractible as disclosed in Bernard et al. U.S. Pat. No. 3,283,121 and is tightly clamped to the outer wall of the bushing 16 by the clamp 28 depicted in FIG. 2.

As previously mentioned, an important object of this liquid cooled welding gun invention is its simplicity, and one of the features which provides this simplicity is the condition that, although no coolant is circulated directly through the head of the gun to drain heat out of the contact tip, a large volume of heat is nevertheless drained from the contact tip into the head member 14 and from the head member into the super-cooled gas nozzle 15. By thus eliminating the need for circulating the coolant directly through the head member of the gun, the complete cooling system has been reduced to two hoses and the super-cooled gas nozzle.

From the standpoint of simplicity, it is a further feature of the invention that the two coolant hoses 18 and 19 run freely through the tubular handle 11 of the gun and directly to the gas nozzle without any hose connections, gaskets, O-rings, or the like inside the handle which, in conventional guns, are a source of costly and troublesome maintenance. Moreover, because the hoses 18 and 19 extend freely through the tubular handle 11, without attachment to or engagement within the handle, the gas nozzle 15 may readily be removed from the head assembly 13 as depicted in FIG. 4 for cleaning without detaching the hoses 18 and 19 from their respective fittings. The freedom of the hoses 18 and 19 to move forwardly and rearwardly within the tubular handle 11 enables the nozzle 15 to be withdrawn from the head member, cleaned, and pushed back onto the head member while the hoses 18 and 19 remain connected to the nozzle 15.

At this juncture, attention may be directed to the fact that the interior wall of the tubular handle 11 is spaced from the main trunk member 12 by a pair of spacer assemblies 38 (FIG. 6) to enable free convective flow of cooling air through the length of the tubular handle 11 as disclosed and claimed in applicants' copending application Ser. No. 840,583, filed June 5, 1969, now U.S. Pat. No. 3,676,640. As described in that application, the air flow handle structure permits a relatively large volume of heat to be conducted from the current contact tip 17 and head member 14 through the main trunk 12 to the welding cable 33 for dissipation in the welding cable in the manner of a heat sink without heating the handle 11 to a temperature too high to be handled by the operator. In the present invention, the air flow concept is brought into cooperation with the liquid cooled nozzle 15 to enable maximum drainage of heat from the head asembly 13.

Each of the spacer assemblies 38 comprises an annular portion 41 which has an internal diameter slightly larger than the external diameter of the main trunk 12 for receiving the main trunk. Protruding from the annular portion 41 are two projections 42 and 43. The projection 42 is internally threaded to receive a mounting screw 44 passed through a hole in the wall of the tubular handle thereby securely fastening the spacer assembly 38 to the handle 11. The projection 43 is internally threaded to receive a set screw 45 for securely fastening the spacer assembly 38 to the main trunk 12. With this arrangement, the handle 11 is not only securely mounted in spaced relation to the main trunk 12 but also in a manner which enables the position of the main trunk 12 within the tubular handle 11 to be adjusted both circumferentially and longitudinally by loosening and retightening the set screws 45.

The spacer assemblies 38 may be fabricated of metal if they are sufficiently electrically insulated from the interior current conducting portion 46 of the main trunk 12 by an insulating sleeve or bushing 47 in the manner illustrated in FIG. 8. Alternatively, the spacer assemblies 38 may be fabricated of heat-resistant electrical insulating material such as asbestos fibers bonded together with a thermo-setting phenolic plastic. In order to maintain a stable mounting condition, the two spacer assemblies are preferably reversed by 180° with respect to one another so that the two mounting screws 44 for the respective spacer assemblies are secured to opposite sides of the tubular handle as depicted in FIG. 1. In order to provide a sufficiently large opening for the coolant supply and outlet tubes to freely extend through the tubular handle 11, the central axis of the annular portion 41 is offset with respect to the central axis of the tubular handle 11 as illustrated in FIGS. 3 and 8. For this reason, the projection 42 is offset relative to the central axis of the annular portion 41 of the spacer assembly 38, and the end portion of the projection 43 is configured to fit the curve of the interior wall of the tubular handle 11 at an angle in order to maintain the axis of the set screw 45 in a radial orientation relative to the main trunk to insure positive fastening of the spacer assembly 38 to the main trunk 12. When used in an arc welding gun which does not require that the central axis of the main trunk be offset relative to the central axis of the tubular handle, the spacer assembly projections may be radially and symmetrically oriented.

In the manufacture of the gas nozzle 15, the inner wall 20 and the outer wall 21 of the nozzle 15 are made preferably from copper tubes machined to shape and dimension, and then permanently joined together by silver soldering or copper alloy brazing. Fittings 25 and 26 are also permanently connected to the gas nozzle 15 by silver soldering or copper alloy brazing. The silver soldering operation is performed quite inexpensively by locating the parts in relation to each other in a suitable fixture which is then placed in a furnace. Obviously there are other methods such as the "Lost Wax" casting method which may be used for making the gas nozzle with the internal heat exchange chamber 22.

While a preferred form of the invention has been illustrated and described, it is to be understood that this is merely by way of example and in no manner to be construed as a limitation. It is contemplated that modifications may be made within the scope of the claims without departing from the spirit of the invention.

What is claimed is:

1. A liquid cooled arc welding gun for continuous-feed, consumable-electrode, gas-shielded arc welding, comprising:

main trunk means for receiving and conducting welding current, arc shielding gas, and consumable electrode through said arc welding gun;

head member and current contact tip assembly means connected to the forward end of said main trunk means for guiding said consumable electrode to the welding arc and electrically energizing said consumable electrode, said assembly means further providing a plurality of gas outlet ports for said arc shielding gas;

a gas nozzle removably telescoped over said head member and current contact assembly means for directing the flow of said arc shielding gas from said gas outlet ports to blanket the welding arc, said gas nozzle having an outer wall and a thin metal inner wall cooperating to form a thin, elongate cylindrical chamber within the interior of said gas nozzle for the circulation of liquid coolant, said outer wall including a coolant inlet port and a coolant outlet port for said cylindrical chamber;

supply hose means for connecting said coolant inlet port to a liquid coolant supply source;

outlet hose means for connecting said coolant outlet port to a reservoir or drain;

a tubular handle having a bore extending longitudinally through the entire length of said handle, said handle bore being telescoped over a portion of the length of said main trunk means;

spacer means for radially spacing the interior surface of said handle bore from the exterior surface of said main trunk means, said handle bore having a cross-sectional area substantially larger than the cross-sectional area of said main trunk means and providing a longitudinally-extending convective duct open at each end for convecting a continuous flow of cooling ambient air through said handle, said spacer means comprising two or more spacer assemblies each including:

an annular portion within which said main trunk means is axially received;

a first projection extending from said annular portion to bear against the interior surface of said handle bore;

a second projection extending from said annular portion to bear against the interior surface of said handle bore;

first fastening means for securing said first projection to said tubular handle; and second fastening means within the interior of said second projection for bearing against the surface of said main trunk means within said spacer annular portion to secure said spacer means to said main trunk means, said second fastening means being releasable to enable longitudinal and circumferential adjustment of said main trunk means relative to said tubular handle.

2. The invention defined in claim 1 wherein the central axis of said annular portions of said spacer assemblies is offset relative to the axis of said tubular handle to provide space for said supply and outlet hose means to freely extend through said tubular handle whereby said gas nozzle may be removed, cleaned, and reinstalled without disconnecting said supply and outlet hose means.

3. A liquid-cooled arc welding gun for continuous-feed, consumable electrode, gas-shielded arc welding, comprising:

a tubular handle;

main trunk means extending from within said tubular handle for receiving and conducting welding current, arc shielding gas, and consumable electrode through said arc welding gun;

head member and current contact tip assembly means connected to the forward end of said main trunk means for guiding said consumable electrode to the welding arc and electrically energizing said consumable electrode, said assembly means further providing a plurality of gas outlet ports for said shielding gas;

a gas nozzle removably telescoped over and electrically insulated from said head member and current contact tip assembly means for directing the flow of said arc shielding gas from said gas outlet ports to blanket the welding arc, said gas nozzle having a thin metal inner wall and another wall cooooperating to form a thin, elongate cylindrical chamber therebetween for the circulation of liquid coolant, said outer wall including a coolant inlet port and a coolant outlet port for said cylindrical chamber;

supply hose means for connecting said coolant inlet port to a liquid coolant supply source;

outlet hose means for connecting said coolant outlet port to a reservoir or drain; and spacer means, disposed within said tubular handle for engaging said main trunk means and suspending said main trunk within the tubular handle, said spacer means having an annular portion for engaging said main trunk and at least two projections extending outwardly from the annular portion, said spacer means having a passageway between said at least two projections slidably and freely carrying said supply and outlet hose means within the tubular handle.

* * * * *